(12) United States Patent
Ray

(10) Patent No.: US 8,964,945 B2
(45) Date of Patent: Feb. 24, 2015

(54) SYSTEM AND METHOD FOR PROVIDING LOCATION BASED E-911 OF NETWORK ACCESS DEVICES REGISTERED WITH A NETWORK GATEWAY

(75) Inventor: Amar N. Ray, Shawnee, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1205 days.

(21) Appl. No.: 11/904,883

(22) Filed: Sep. 28, 2007

(65) Prior Publication Data

US 2009/0086932 A1  Apr. 2, 2009

(51) Int. Cl.
*H04M 11/04* (2006.01)
*H04W 4/22* (2009.01)
*H04W 76/00* (2009.01)

(52) U.S. Cl.
CPC .............. *H04W 4/22* (2013.01); *H04W 76/007* (2013.01); *H04M 11/04* (2013.01)
USPC .................... 379/45; 379/39; 379/46; 379/49

(58) Field of Classification Search
USPC ...................................... 379/37–51
See application file for complete search history.

(56) References Cited

U.S. PATENT DOCUMENTS

| | | | |
|---|---|---|---|
| 5,339,351 A | 8/1994 | Hoskinson et al. | |
| 5,379,337 A | 1/1995 | Castillo et al. | |
| 5,497,149 A | 3/1996 | Fast | |
| 5,555,286 A | 9/1996 | Tendler | |
| 5,646,987 A | 7/1997 | Gerber et al. | |
| 5,937,038 A | 8/1999 | Bell et al. | |
| 6,137,877 A | 10/2000 | Robin et al. | |
| 6,240,285 B1 | 5/2001 | Blum et al. | |
| 6,317,049 B1 | 11/2001 | Toubia et al. | |
| 6,366,772 B1 | 4/2002 | Arnson | |
| 6,415,018 B1 | 7/2002 | Antonucci et al. | |
| 6,480,578 B1 | 11/2002 | Allport | |
| 6,526,125 B1 | 2/2003 | Lindsay et al. | |
| 6,591,112 B1 | 7/2003 | Siccardo et al. | |
| 6,642,844 B2 | 11/2003 | Montague | |
| 6,678,357 B2 | 1/2004 | Stumer et al. | |
| 6,690,932 B1 | 2/2004 | Barnier et al. | |
| 6,771,163 B2 | 8/2004 | Linnett et al. | |
| 6,839,022 B1 | 1/2005 | Benco et al. | |
| 7,026,925 B2 | 4/2006 | Roche et al. | |
| 7,079,627 B2 | 7/2006 | Crago et al. | |
| 7,095,733 B1 | 8/2006 | Yarlgadda et al. | |

(Continued)

OTHER PUBLICATIONS

Response filed Nov. 2, 2010 for U.S. Appl. No. 11/891,784.

(Continued)

*Primary Examiner* — Melur Ramakrishnaiah
(74) *Attorney, Agent, or Firm* — Swanson & Bratschun, L.L.C.

(57) ABSTRACT

A system and method for providing location information to a public safety answering point may include registering network access points with a gateway. The registration may include address location of each network access point to enable the gateway to look-up and communicate the address location of a registered network access point during an emergency 911 call. The network access points may be WiFi access points. The network access point address location information may be communicated using a type II caller ID data packets after the public safety answering point goes off-hook. By communicating both the access point address information and GPS location information, PSAPs that are configured as E911 Phase I and E911 Phase II may display address information of an emergency 911 caller.

16 Claims, 8 Drawing Sheets

(56) References Cited

U.S. PATENT DOCUMENTS

| | | |
|---|---|---|
| 7,098,787 B2 | 8/2006 | Miller |
| 7,231,218 B2 | 6/2007 | Diacakis et al. |
| 7,269,413 B2 | 9/2007 | Kraft |
| 7,342,917 B2 | 3/2008 | Mohan et al. |
| 7,386,103 B1 | 6/2008 | Chahal |
| 7,418,087 B2 | 8/2008 | Luneau et al. |
| 7,496,189 B2 * | 2/2009 | Clarisse et al. .......... 379/207.15 |
| 7,574,194 B2 | 8/2009 | Yang et al. |
| 7,679,505 B1 | 3/2010 | Vallaire |
| 7,706,356 B1 | 4/2010 | Olshansky et al. |
| 7,734,019 B1 | 6/2010 | Terpstra |
| 7,773,975 B2 | 8/2010 | Snapp et al. |
| 7,920,679 B1 | 4/2011 | Naim et al. |
| 7,991,135 B2 | 8/2011 | Rauba et al. |
| 8,014,341 B1 | 9/2011 | Ray |
| 8,102,986 B1 | 1/2012 | McClintock et al. |
| 8,295,801 B2 | 10/2012 | Ray et al. |
| 8,320,871 B2 | 11/2012 | Ray et al. |
| 8,364,113 B2 | 1/2013 | Ray et al. |
| 8,447,267 B2 | 5/2013 | Ray et al. |
| 8,615,214 B2 | 12/2013 | Jain et al. |
| 8,630,609 B2 | 1/2014 | Ray et al. |
| 8,712,366 B2 | 4/2014 | Greene et al. |
| 8,718,595 B2 | 5/2014 | Ray et al. |
| 8,891,749 B2 | 11/2014 | Geldbach et al. |
| 8,923,803 | 12/2014 | Ray et al. |
| 2001/0003843 A1 | 6/2001 | Scepanovic et al. |
| 2001/0004588 A1 | 6/2001 | Hong |
| 2001/0012379 A1 | 8/2001 | Amemiya et al. |
| 2002/0012323 A1 | 1/2002 | Petite et al. |
| 2002/0016189 A1 | 2/2002 | Sheynblat et al. |
| 2002/0054667 A1 | 5/2002 | Martinez |
| 2002/0136363 A1 | 9/2002 | Stumer et al. |
| 2003/0012344 A1 | 1/2003 | Agarwal et al. |
| 2003/0063714 A1 | 4/2003 | Stumer et al. |
| 2003/0109245 A1 | 6/2003 | McCalmont et al. |
| 2003/0133450 A1 * | 7/2003 | Baum ........................... 370/389 |
| 2003/0158668 A1 | 8/2003 | Anderson |
| 2004/0072583 A1 | 4/2004 | Weng |
| 2004/0077347 A1 | 4/2004 | Lauber et al. |
| 2004/0090950 A1 | 5/2004 | Lauber et al. |
| 2004/0176123 A1 | 9/2004 | Chin et al. |
| 2004/0257273 A1 | 12/2004 | Benco et al. |
| 2005/0002499 A1 | 1/2005 | Ordille et al. |
| 2005/0003797 A1 | 1/2005 | Baldwin |
| 2005/0070315 A1 | 3/2005 | Rai et al. |
| 2005/0101287 A1 | 5/2005 | Jin et al. |
| 2005/0111630 A1 | 5/2005 | Potorny et al. |
| 2005/0123102 A1 | 6/2005 | Beason et al. |
| 2005/0151642 A1 | 7/2005 | Tupler et al. |
| 2005/0159132 A1 | 7/2005 | Wright et al. |
| 2005/0169248 A1 | 8/2005 | Truesdale et al. |
| 2005/0197096 A1 | 9/2005 | Yang et al. |
| 2005/0201358 A1 | 9/2005 | Nelson et al. |
| 2005/0209781 A1 | 9/2005 | Anderson |
| 2005/0232225 A1 | 10/2005 | Pelaez et al. |
| 2005/0265326 A1 | 12/2005 | Laliberte |
| 2006/0009190 A1 | 1/2006 | Laliberte |
| 2006/0043164 A1 | 3/2006 | Dowling et al. |
| 2006/0052134 A1 | 3/2006 | Sato |
| 2006/0072547 A1 | 4/2006 | Florkey et al. |
| 2006/0133582 A1 | 6/2006 | McCulloch |
| 2006/0217136 A1 | 9/2006 | Bantukul et al. |
| 2006/0219542 A1 | 10/2006 | Savir |
| 2006/0234726 A1 * | 10/2006 | Ashley et al. ............... 455/456.4 |
| 2006/0234727 A1 | 10/2006 | Ashley et al. |
| 2006/0293024 A1 * | 12/2006 | Benco et al. ............... 455/404.2 |
| 2007/0003024 A1 | 1/2007 | Olivier et al. |
| 2007/0041368 A1 | 2/2007 | Lorello |
| 2007/0064882 A1 | 3/2007 | Ger et al. |
| 2007/0121851 A1 | 5/2007 | Maropis et al. |
| 2007/0201391 A1 | 8/2007 | Belmonte et al. |
| 2007/0273519 A1 | 11/2007 | Ichikawa et al. |
| 2007/0280428 A1 | 12/2007 | McClelland |
| 2007/0287473 A1 | 12/2007 | Dupray |
| 2008/0018452 A1 | 1/2008 | McCarthy et al. |
| 2008/0026728 A1 | 1/2008 | Snapp et al. |
| 2008/0057944 A1 | 3/2008 | Miriyala et al. |
| 2008/0064363 A1 | 3/2008 | Salafia et al. |
| 2008/0064375 A1 | 3/2008 | Gottlieb |
| 2008/0070546 A1 | 3/2008 | Lee |
| 2008/0144779 A1 | 6/2008 | Ray et al. |
| 2008/0200143 A1 | 8/2008 | Qiu et al. |
| 2008/0261557 A1 | 10/2008 | Sim |
| 2008/0273670 A1 | 11/2008 | Dickinson |
| 2008/0304630 A1 | 12/2008 | Nguyen et al. |
| 2009/0047924 A1 * | 2/2009 | Ray et al. .................... 455/404.2 |
| 2009/0097474 A1 | 4/2009 | Ray et al. |
| 2009/0144260 A1 | 6/2009 | Bennett et al. |
| 2009/0186596 A1 | 7/2009 | Kaltsukis |
| 2009/0197567 A1 | 8/2009 | Ogram |
| 2009/0214011 A1 | 8/2009 | Geldbach et al. |
| 2009/0227225 A1 | 9/2009 | Mitchell et al. |
| 2009/0305730 A1 | 12/2009 | Herz et al. |
| 2009/0310602 A1 * | 12/2009 | Olshansky et al. ........... 370/352 |
| 2010/0002845 A1 | 1/2010 | Zerillo et al. |
| 2010/0002846 A1 | 1/2010 | Ray et al. |
| 2010/0003946 A1 | 1/2010 | Ray et al. |
| 2010/0003947 A1 | 1/2010 | Ray et al. |
| 2010/0003949 A1 | 1/2010 | Ray et al. |
| 2010/0003954 A1 | 1/2010 | Ray et al. |
| 2010/0003955 A1 | 1/2010 | Ray et al. |
| 2010/0003961 A1 | 1/2010 | Ray et al. |
| 2010/0098062 A1 | 4/2010 | Croak et al. |
| 2010/0107192 A1 | 4/2010 | Sennett et al. |
| 2010/0142386 A1 | 6/2010 | Snapp et al. |
| 2010/0215153 A1 | 8/2010 | Ray et al. |
| 2010/0291894 A1 | 11/2010 | Pipes |
| 2011/0014923 A1 | 1/2011 | Krco et al. |
| 2011/0096769 A1 | 4/2011 | Sim |
| 2012/0214437 A1 | 8/2012 | Ray et al. |
| 2012/0309340 A1 | 12/2012 | Ray |
| 2013/0012156 A1 | 1/2013 | Ray et al. |
| 2013/0059560 A1 | 3/2013 | Ray et al. |
| 2013/0102269 A1 | 4/2013 | Ray et al. |
| 2013/0217355 A1 | 8/2013 | Ray et al. |
| 2013/0237181 A1 | 9/2013 | Ray |

OTHER PUBLICATIONS

U.S. Appl. No. 12/257,641; Issue Notification dated Nov. 7, 2012; 1 page.
U.S. Appl. No. 12/257,862; Non-Final Rejection dated Mar. 13, 2013; 30 pages.
U.S. Appl. No. 13/460,507; Non-Final Rejection dated Apr. 26, 2013; 19 pages.
U.S. Appl. No. 13/614,585; Issue Notification dated May 1, 2013; 1 page.
U.S. Appl. No. 13/715,808; Non-Final Rejection dated Apr. 9, 2013; 36 pages.
U.S. Appl. No. 12/257,424; Non-Final Rejection dated Jul. 8, 2013; 46 pages.
U.S. Appl. No. 12/257,862; Non-Final Rejection dated Aug. 23, 2013; 29 pages.
U.S. Appl. No. 13/715,808; Notice of Allowance dated Sep. 13, 2013; 27 pages.
U.S. Appl. No. 13/847,388; Non-Final Office Action dated Jul. 17, 2013; 54 pages.
U.S. Appl. No. 12/257,624; Non-Final Rejection dated Oct. 16, 2013; 38 pages.
U.S. Appl. No. 12/391,503; Non Final Office Action dated Oct. 25, 2013; 23 pages.
U.S. Appl. No. 12/257,928; Non-Final Rejection dated Nov. 20, 2013; 35 pages.
U.S. Appl. No. 12/257,424; Final Rejection dated Nov. 21, 2013; 34 pages.
U.S. Appl. No. 12/257,862; Notice of Allowance dated Dec. 6, 2013; 21 pages.
U.S. Appl. No. 13/847,388; Non-Final Office Action dated Dec. 9, 2013; 34 pages.
U.S. Appl. No. 13/460,507; Notice of Allowance dated Dec. 20, 2013; 20 pages.

(56) References Cited

OTHER PUBLICATIONS

U.S. Appl. No. 13/715,808; Issue Notification dated Dec. 24, 2013; 1 page.
U.S. Appl. No. 11/640,714; Non-Final Rejection dated May 29, 2014; 50 pages.
U.S. Appl. No. 12/257,424; Non-Final Rejection dated Apr. 17, 2014; 39 pages.
U.S. Appl. No. 12/257,624; Final Office Action dated May 13, 2014; 28 pages.
U.S. Appl. No. 12/257,862; Issue Notification dated Apr. 9, 2014; 1 page.
U.S. Appl. No. 12/257,928; Notice of Allowance dated Mar. 6, 2014; 20 pages.
U.S. Appl. No. 13/460,507; Issue Notification dated Apr. 16, 2014.
U.S. Appl. No. 13/612,558; Non-Final Rejection dated Apr. 11, 2014; 37 pages.
U.S. Appl. No. 13/847,388; Final Rejection dated Apr. 7, 2014; 36 pages.
U.S. Appl. No. 12/070,909; Notice of Allowance dated Jul. 23, 2014; 33 pages.
U.S. Appl. No. 12/257,424; Notice of Allowance dated Aug. 11, 2014; 36 pages.
U.S. Appl. No. 12/257,928; Issue Notification dated Jun. 25, 2014; 1 page.
U.S. Appl. No. 12/391,503; Final Rejection dated Jun. 5, 2014; 39 pages.
U.S. Appl. No. 13/847,388; Non-Final Rejection dated Jul. 17, 2014; 39 pages.
U.S. Appl. No. 13/848,649; Non-Final Rejection dated Jul. 17, 2014; 21 pages.
Dale N. Hatfield, "A Report on Technical and Operational Issues Impacting the Provision of Wireless Enhanced 911 Services," Federal Communications Commission, printed from the World Wide Web on May 8, 2006 (54 pages).
Ansi, "TIA Standard Telecommunications Telephone Terminal Equipment Caller Identity and Visual Message Waiting Indicator Equipment Performance Requirements," TIA-777-A, Revision of TIA/EIA-777, May 1, 2003 (77 pages).
Micro Engineering Labs, Inc., "Caller ID", Retrieved from the Internet at URL: <http://www.melabs.com/resources/callerid.htm> on Apr. 24, 2006; Copyright 2006 by microEngineering Labs, Inc (as of date of retrieval, article last updated Apr. 16, 2006) (3 pages).
Dave Ryan & Asher Hazanchuk, "On-Hook & Off-Hook Caller ID Using DSP," Circuit Cellular Ink # 83, Jun. 1997 (12 pages).
Ittiam Systems, "Caller Identification (CLI or Caller ID)," Retrieved from the Internet on Apr. 24, 2006 at URL <http://www.ittiam.com/pages/products/cid.htm, downloaded from the World Wide Web on Apr. 24, 2006 (2 pages).
"AT & T Wireless Unleashes the First and Only Wireless Messaging Device", PhysOrg.com, Sep. 30, 2004; available online at URL: <http://www.physorg.com/news1392.html> (12 pages).
Non-Final Office Action date mailed Aug. 3, 2010 for U.S. Appl. No. 11/891,784.
Non-Final Rejection mailed Jan. 19, 2011 for U.S. Appl. No. 11/430,232.
Non-Final Rejection mailed Mar. 17, 2011 for U.S. Appl. No. 11/640,714.
RCE filed on Apr. 4, 2011 for U.S. Appl. No. 11/891,784.
Final Rejection mailed Jan. 3, 2011 for U.S. Appl. No. 11/891,784.
Non-Final Rejection mailed Mar. 4, 2011 for U.S. Appl. No. 12/257,424.
"NENA Recommended Generic Standards for E9-1-1 PSAP Equipment" NENA Technical Reference. NENA-04-001 Issue 2, Mar. 2001.
Non-Final Rejection mailed Mar. 28, 2011 for U.S. Appl. No. 12/272,238.
Non-Final Rejection mailed Apr. 1, 2011 for U.S. Appl. No. 12/257,655.
Non-Final Rejection mailed Mar. 3, 2011 for U.S. Appl. No. 12/257,416.
Non-Final Rejection mailed Mar. 17, 2011 for U.S. Appl. No. 12/257,640.
U.S. Appl. No. 11/430,232; Notice of Allowance dated May 13, 2011; 12 pages.
U.S. Appl. No. 11/430,232; Issue Notification dated Aug. 17, 2011; 1 page.
U.S. Appl. No. 11/640,714; Non-Final Rejection dated Sep. 15, 2011; 15 pages.
U.S. Appl. No. 11/640,714; Final Rejection dated Feb. 29, 2012; 17 pages.
U.S. Appl. No. 11/891,784; Notice of Allowance dated Jul. 18, 2012; 27 pages.
U.S. Appl. No. 12/257,424; Final Rejection dated Jun. 13, 2012; 41 pages.
U.S. Appl. No. 12/257,424; Non-Final Rejection dated Jan. 31, 2012; 21 pages.
U.S. Appl. No. 12/257,424; Final Rejection dated Jul. 14, 2011; 19 pages.
U.S. Appl. No. 11/974,775; Notice of Allowance dated Jun. 12, 2012; 15 pages.
U.S. Appl. No. 11/974,775; Notice of Allowance dated Apr. 27, 2012; 12 pages.
U.S. Appl. No. 11/974,775; Non-Final Rejection dated Nov. 7, 2011; 19 pages.
U.S. Appl. No. 11/974,775; Non-Final Rejection dated May 10, 2011; 24 pages.
U.S. Appl. No. 12/168,668; Non-Final Rejection dated Feb. 6, 2012; 21 pages.
U.S. Appl. No. 12/070,909; Final Rejection dated Jan. 10, 2012; 9 pages.
U.S. Appl. No. 12/070,909; Non-Final Rejection dated Aug. 16, 2011; 13 pages.
U.S. Appl. No. 12/257,574; Final Rejection dated Dec. 29, 2011; 18 pages.
U.S. Appl. No. 12/257,574; Non-Final Rejection dated Jul. 6, 2011; 20 pages.
U.S. Appl. No. 12/257,624; Final Rejection dated Jan. 31, 2012; 14 pages.
U.S. Appl. No. 12/257,624; Non-Final Rejection dated Oct. 6, 2011; 19 pages.
U.S. Appl. No. 12/257,641; Notice of Allowance dated Aug. 2, 2012; 17 pages.
U.S. Appl. No. 12/257,641; Notice of Allowance dated Feb. 2, 2012; 12 pages.
U.S. Appl. No. 12/257,641; Non-Final Rejection dated May 24, 2011; 17 pages.
U.S. Appl. No. 12/257,928; Non-Final Rejection dated Jun. 8, 2011; 21 pages.
U.S. Appl. No. 12/257,862; Final Rejection dated Nov. 30, 2011; 15 pages.
U.S. Appl. No. 12/257,862; Non-Final Rejection dated May 24, 2011; 19 pages.
U.S. Appl. No. 12/272,238; Notice of Allowance dated Jun. 8, 2012; 21 pages.
U.S. Appl. No. 12/272,238; Pre-Brief Appeal Conference Decision dated Jan. 17, 2012; 2 pages.
U.S. Appl. No. 12/272,238; Notice of Appeal and Pre-Brief Conference Request dated Dec. 28, 2011; 6 pages.
U.S. Appl. No. 12/272,238; Final Rejection dated Sep. 29, 2011; 12 pages.
U.S. Appl. No. 11/891,784; Issue Notification dated Sep. 26, 2012; 1 page.
U.S. Appl. No. 11/974,775; Corrected Notice of Allowability dated Aug. 31, 2012; 7 pages.
U.S. Appl. No. 11/974,775; Issue Notification dated Sep. 26, 2012; 1 page.
U.S. Appl. No. 12/257,574; Notice of Allowance dated Sep. 14, 2012; 25 pages.
U.S. Appl. No. 12/272,238; Issue Notification dated Oct. 3, 2012; 1 page.
U.S. Appl. No. 13/460,507; Non-Final Rejection dated Aug. 16, 2012; 28 pages.

(56) References Cited

OTHER PUBLICATIONS

U.S. Appl. No. 12/257,574; Issue Notification dated Jan. 9, 2013; 1 page.
U.S. Appl. No. 13/150,725; Non-Final Rejection dated Nov. 26, 2012: 19 pages.
U.S. Appl. No. 13/460,507; Final Rejection dated Dec. 20, 2012; 14 pages.
U.S. Appl. No. 13/614,585; Notice of Allowance dated Dec. 11, 2012; 30 pages.
Federal Standard 1037C: Telecommunications: Glossary of Telecommunication Terms. National Communication System. Technology and Standards Division. Washington, DC: General Services Administration, Information Technology Service, 1996. pp. vii, A-28, H-7, O.
U.S. Appl. No. 12/391,503; Non Final Office Action dated Feb. 16, 2012: 9 pages.
U.S. Appl. No. 12/391,503; Final Rejection dated May 24, 2012; 19 pages.
U.S. Appl. No. 11/640,714; Notice of Allowance dated Dec. 12, 2014; 41 pages.
U.S. Appl. No. 12/070,909; Issue Notification dated Oct. 29, 2014; 1 page.
U.S. Appl. No. 12/168,668; Notice of Allowance dated Oct. 7, 2014; 31 pages.
U.S. Appl. No. 12/257,424; Issue Notification dated Dec. 10, 2014; 1 page.
U.S. Appl. No.13/612,558; Notice of Allowance dated Sep. 16, 2014; 16 pages.
U.S. Appl. No.13/847,388; Final Rejection dated Dec. 4, 2014; 39 pages.

\* cited by examiner

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
|   |   |   |   |   | CALL | | BACK | | NUMBER | | | | | | | | | TIME HRS: MIN | | | | | | | | MONTH/DATE | | | | | |
| 1 | ( | 9 | 1 | 3 | ) | | 5 | 5 | 5 | - | 1 | 2 | 3 | 4 | | | | 1 | 9 | : | 5 | 4 | | | | 1 | 1 | / | 2 | 5 | |
| 2 | S | T | R | E | E | T | # | | | | | | | | | S | T | R | E | E | T | | N | A | M | E | | | | | |
| 3 | C | O | M | M | U | N | I | T | Y | | N | A | M | E | | | | | S | T | | E | S | N | | W | P | H | 2 | | |
| 4 | W | I | R | E | L | E | S | S | | S | P | + | 2 | 4 | X | 7 | C | O | N | T | A | C | T | | N | U | M | B | E | R | |
| 5 | P | H | A | S | E | - | I | I | | M | A | P | | I | D | | | P | A | N | I | | E | S | R | K | / | | E | S | R | D |
| 6 | P | R | I | M | A | R | Y | | W | I | R | E | L | E | S | S | | P | S | A | P | | T | O | | W | H | I | C | H | | |
| 7 | C | A | L | L | | W | A | S | | | | | | | | | | | | | | | | | | | | | | | | |
| 8 | R | O | U | T | E | D | | | | | | | | | | | | | | | | | | | | | | | | | | |
| 9 | L | A | T | | +/- | L | A | T | I | T | U | D | E | | | | | | L | O | N | | +/- | L | O | N | G | I | T | U | D | E |
| 10 | M | E | T | E | R | S | | | | | | | | | | | | P | E | R | C | E | N | T | | | | | | | | |

SYSTEM AND METHOD FOR PROVIDING LOCATION BASED E-911 OF NETWORK ACCESS DEVICES REGISTERED WITH A NETWORK GATEWAY

BACKGROUND

The National Telecommunications Information Administration (NTIA) is the executive branch's advisory agency on telecommunications issues. In the early 1980s, this agency proposed a plan to raise awareness of a single emergency telephone number to the general public. From that program, the National Emergency Number Association (NENA), a non-profit organization, was created. NENA has since become a leading organization to improving technology and developing guidelines for 9-1-1 ("911") telephone calls (i.e., emergency telephone calls) to improve response by emergency rescue teams.

Telecommunications has been changing rapidly over the past several years, primarily since the development and growth of the mobile telephone industry and the Internet. New forms of telecommunications have been developing as well. Traditional telecommunications were performed over the public switch telephone network (PSTN. A system to maintain location of subscribers of telecommunications companies operating on the PSTN was developed. Determining the location of subscribers of the telecommunications companies was relatively easy as the locations of telephones were known by the telecommunications companies or carriers due to installing the telephones, establishing billing, or otherwise. However, with the new forms of telecommunications, subscribers are able to use wireless devices that may access different wireless access points to communicate over a communications network, such as the Internet. One common interface for wireless access to a communications network includes an IEEE 802.11 communications protocol, which is commonly known by the brand name WiFi. Wireless devices are being configured to have WiFi communications protocols to enable a subscriber to access WiFi enabled access points. Many WiFi enabled wireless devices have global positioning system (GPS) capabilities that are able to communicate GPS location information (i.e., latitude and longitude coordinates) of the WiFi enabled device. While GPS location information may be helpful to track or locate a person at a precise geographical location, such information is not extremely useful in an emergency situation where emergency rescue PERSONNEL, such as firemen and police, better understand address information for performing an emergency rescue in an emergency situation.

A public safety answering position (PSAP) is used by emergency services to answer calls from the public to notify emergency personnel to respond to an emergency situation. Traditionally, a caller would contact a PSAP and provide location information during the telephone call. When caller identification (i.e., caller ID) was introduced, PSAPs were installed with telephone systems compatible with caller ID to identify names and phone numbers of individuals placing emergency 911 calls. This first version of caller ID is known as type I caller ID. Type I caller ID operates in a single data message format (SDMF) as well as multiple data message format (MD) that provide a caller's telephone number, date, and time of the call during the ringing interval.

A second type of caller ID or type II caller ID was later developed to communicate name and telephone number information of a calling party to a called party when a call between a called party and a first calling party is in progress. Type II caller ID uses a multiple data message format (MDMF) that communicates a caller's name, telephone number, date, and time. Enhanced 911 is a North American Telephone Network (NATN) feature of the 911-emergency-calling system that uses a reverse telephone directory provided by cellular telephone companies to determine name of a caller and location of a cell node to which the caller is connected.

There are two types of E911 systems that operate within the United States, Phase I and Phase II. E911 Phase I systems are required to provide an operator with the telephone number, originator, and location of the cell site or base station receiving a 911 call. E911 Phase II systems are required to use automatic location identification (ALI) database. However, only 18% of all PSAPs are configured with E911 Phase II systems. The remaining 82% of PSAPs are configured with E911 Phase I systems, which are incapable of handling GPS coordinates, and, therefore, subscribers who have wireless telephones that use GPS coordinates for 911 emergency calls cannot be properly serviced by these PSAPs. If a caller is using a non-cellular wireless device, such as a WiFi enabled wireless device, an operator at a PSAP with E911 Phase I capabilities is unable to determine address location based on GPS coordinates that are received from the caller. And, because WiFi enabled wireless devices do not communicate via a cellular network, there is no cell site or base station location information to be communicated to the PSAP.

Wireless communications devices, such as WiFi communications devices, are currently limited in their ability to place emergency 911 calls due to (i) the wireless devices being moved and communicating with different wireless access, (ii) local and third party ALI databases not having capabilities to convert the GPS coordinates into address locations, and (iii) other WiFi mesh network shortcomings.

SUMMARY

To overcome the problem of WiFi mesh networks being limited in providing address location information of emergency 911 callers to public safety answering points, the principles of the present invention provide for address information of a WiFi access point over which a WiFi enabled wireless device is communicating to be communicated to a PSAP via a Type II caller ID data packet in addition to communicating GPS coordinate information. By providing both address information of the WiFi access point and GPS information, PSAPs, whether configured as E911 Phase I or Phase II, are able to provide an operator at the PSAP with location information of a caller using a WiFi enabled wireless device that accesses a communications network via a network access point, such as a WiFi access point.

One embodiment of a system for providing address location information to a public safety answering point during a wireless 911 call may include multiple network access points configured to receive calls from wireless devices. The network access points may be WiFi access points. A gateway may be in communication with the network access points. In one embodiment, the gateway may include a controller configured to receive communications from the network access points and an interpreter configured to interpret first signals having a protocol for communication over a first network into second signals having a protocol for communication over a second network, the second signals being communicated over the second network on which public safety answering points operating to service emergency 911 calls are operating. A first database may be in communication with the gateway and be configured to store network address information of selective routers associated with the public safety answering points. A second database may be in communication with the gateway and be configured to store address location information of the network access points. The gateway may further be configured to receive an emergency 911 call and, in response to receiving the emergency 911 call, (i) determine network address information of a selective router associated with a public safety answering point operating to service emergency 911 calls for an area in which the network access points are operating, (ii) determine an address location of the network access point that received the emergency 911 call, and (iii) send the address location of the network access point to the public safety answering point.

One process for communicating address location information of a network access point to a public safety answering point during an emergency 911 call may include registering address location information of multiple network access points. In one embodiment, the network access points are WiFi network access points that form a WiFi mesh network and the registration is with a controller of a gateway. A call from a wireless device via one of the registered network access points may be received and a determination that the call is an emergency 911 call may be made. The determination may be made by a gateway receiving an ADC code from the network access point. Network address information of a selective router associated with a public safety answering point operating to service emergency 911 calls from the network access point may be requested. The request may be from the gateway to a database that includes selective router network addresses. A call with the public safety answering point may be established. In response to receiving a signal indicative of the public safety answering point going off-hook, an address location of the network access point that received the emergency 911 call from the registered location information of the network access points may be determined. The address location of the network access point may be sent to the public safety answering point. In one embodiment, the address location is sent via a type II caller ID data packet.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF DRAWINGS

Figure 1:
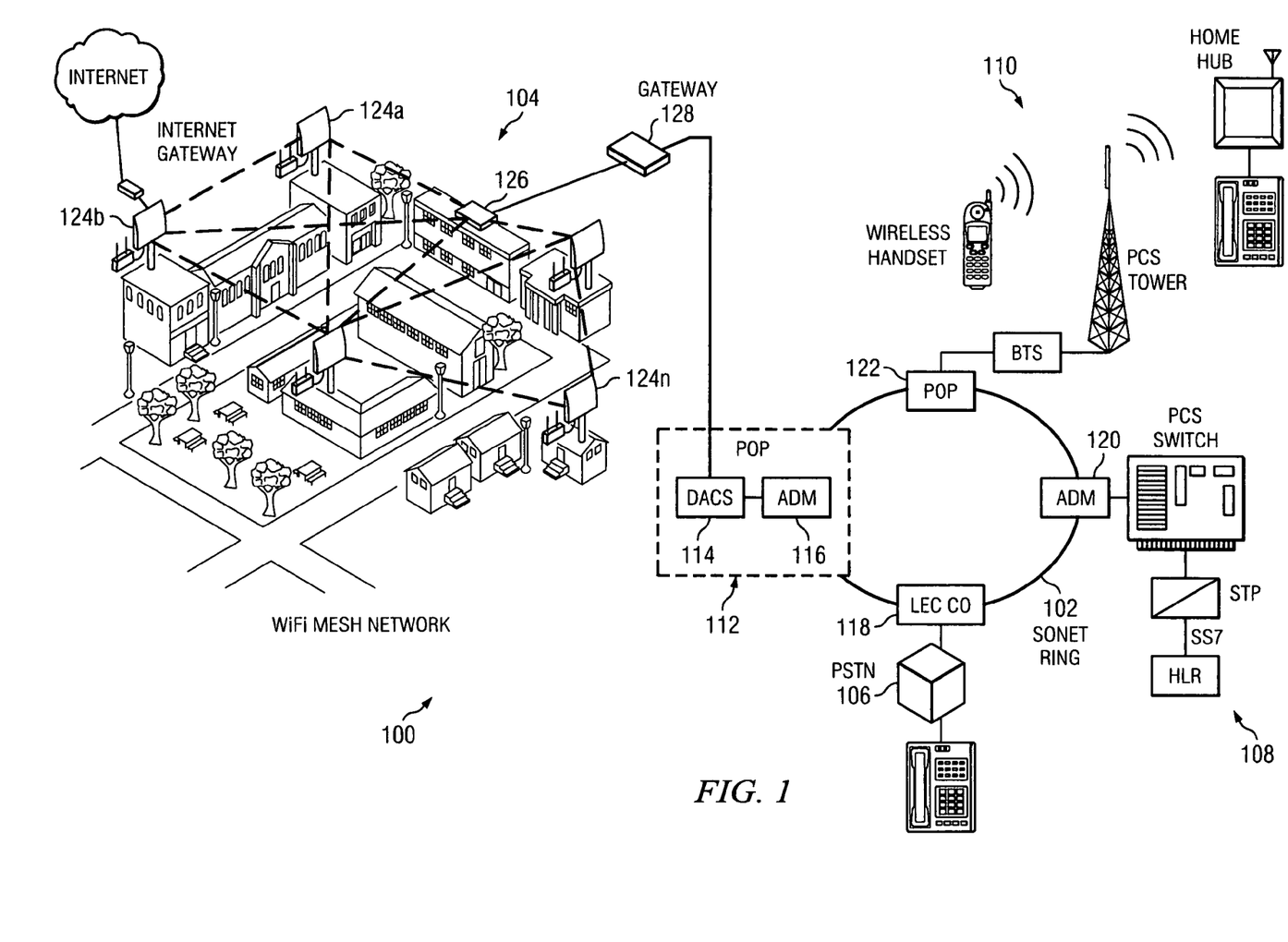
FIG. 1 is an illustration of multiple exemplary networks operating on a synchronous optical network.

FIG. 1 is an illustration of multiple exemplary networks 100 operating on a synchronous optical network ("SONE") 102. The networks 100 include a WiFi mesh network 104, public switched telephone network (PSTN 106, personal communications service or mobile network 108, and wireless network 110. The WiFi mesh network 104 accesses the SONET ring 102 via a point-of-presence (POP) 112 that may include a digital access cross-connect system (DACS) 114 and add drop multiplexer (ADM) 116. The PSTN 106 may access the SONET ring 102 via a local exchange carrier central office 118. The mobile network 108 may access the SONET ring 102 via an add drop multiplexer 120. The wireless network 110 may access the SONET ring 102 via a POP 122.

The WiFi mesh network 104 includes WiFi access points 124a-124n (collectively 124) that enable subscribers using WiFi enabled wireless devices to access the WiFi mesh network 104. As understood in the art, the WiFi access points 124 are configured to communicate with each other, and a controller 126 is configured to control communications on the WiFi mesh network 104. Each WiFi access point 124 registers with the controller 126 so that the controller knows when communications signals are being received from a particular WiFi access point. If the controller 126 determines that communications signals being received from a WiFi access point are to be communicated to another network, such as the PSTN 106, then the controller 126 communicates with a gateway 128. The gateway 128 operates as an interpreter between networks to translate signals of one network and signals of another network. For example, the gateway 128 may interpret or translate between time division multiplexed signaling, which is one of the signaling formats of the SONET ring 102, and VoIP signals that are communicated on the WiFi mesh network 104. In one embodiment, the controller 126 may be part of the gateway 128 (see FIGS. 3A and 3B). It should be understood that the gateway 128 may interpret between other communications protocols. It should further be understood that although a WiFi mesh network 104 is shown, such a wireless network is exemplary and that the principles of the present invention may be applied to other communications protocols, currently existing or developed in the future.

Because WiFi wireless devices communicate via different WiFi access points while moving within a WiFi mesh network, address information of WiFi enabled wireless devices and WiFi access points 124 have not been available to PSAPs. PSAPs with E911 Phase II capabilities can determine address location reverse lookup using a calling party's telephone number, as understood in the art, but PSAPs with E911 Phase I capabilities cannot determine location of either a WiFi enabled wireless device or WiFi access point. The principles of the present invention may use abbreviated dialing codes (ADC) to notify the gateway 128 of an emergency 911 call, which, in turn, may provide the PSAP with the address location of an access point to which a WiFi enabled wireless device is in communication in response to the PSAP going off-hook to answer the 911 call. In addition, an address location information database (not shown) that contains addresses of each registered wireless access point may be accessible to the gateway 128 to enable the gateway 128 to look-up and communicate an address location of the wireless access point that initially received the emergency 911 call.

Figure 2:
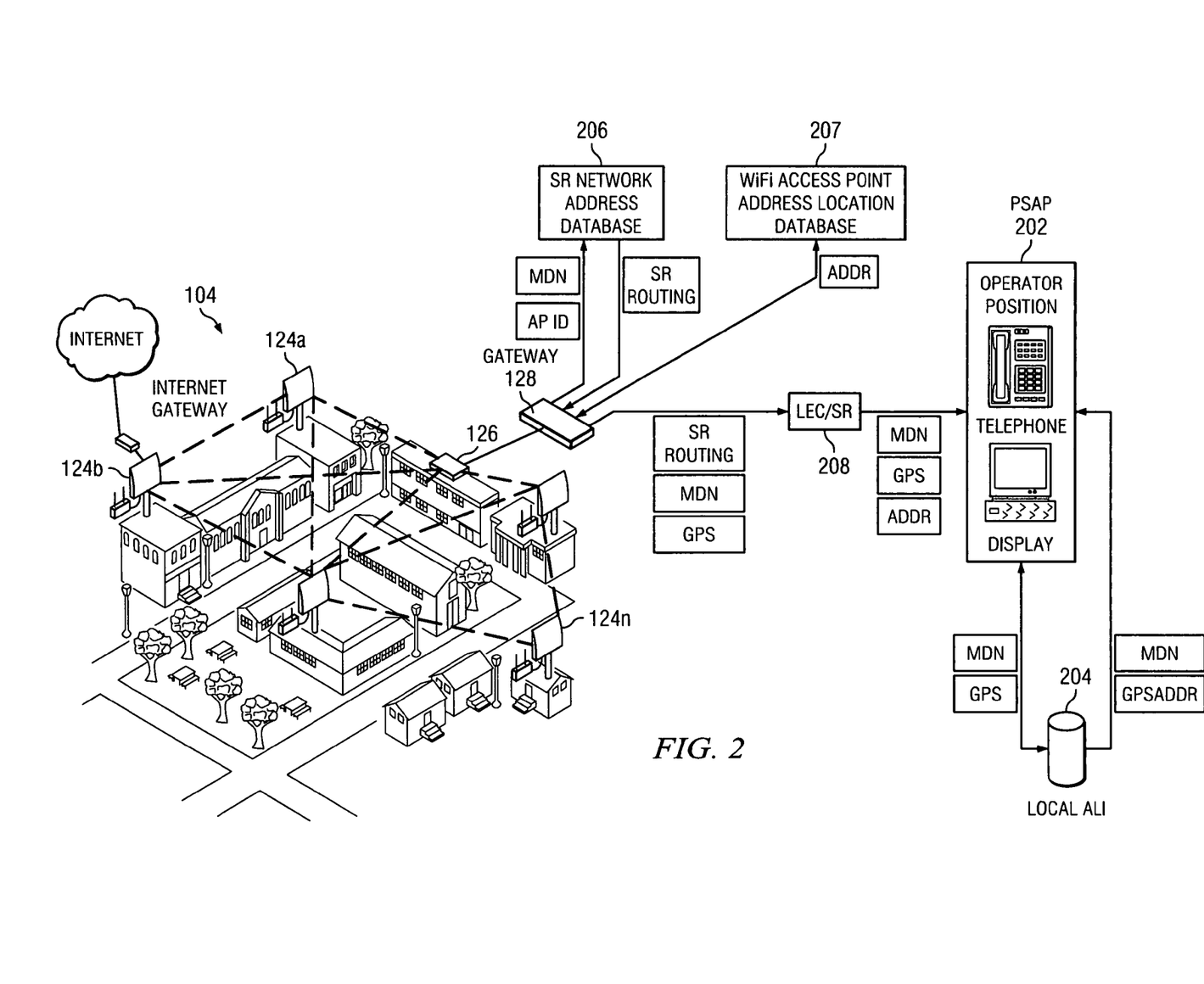
FIG. 2 is an illustration of a WiFi mesh network in communication with a public safety answering point.

FIG. 2 is an illustration of the WiFi mesh network 104 of FIG. 1 in communication with a public safety answering point (PSAP) 202. As shown, PSAP 202 is in communication with a local automated location identifier (ALI) database 204 (hereinafter "ALI") that is capable of supporting PSAP 202 for determining an address of a caller. However, local ALIs are generally limited in being able to perform such a conversion, so remote, mainframe ALIs managed by a third-party may be used to perform such a conversion to determine an address based on the GPS coordinates. Mainframe ALIs, however, have limited capabilities for voice over IP (VoIP) communications using WiFi mesh network as understood in the art. And, since only 18% of PSAPs are E911 Phase II compatible, the principles of the present invention provide for communicating an address using a type II caller ID protocol to ensure that both E911 Phase I and II PSAPs receive address location information of the WiFi access point that initially received the emergency 911 call.

The PSTN includes many selective routers that are associated with thousands of PSAPs in the United States. Because there are so many selective routers and PSAPs located on the PSTN, the gateway 128 has to determine which selective router to send the information associated with an emergency 911 call. A selective router network address database 206 with which the gateway 128 communicates includes network address information of selective routers associated with PSAPs servicing an area in which the WiFi access point is located, so that a gateway 128, in response to receiving an emergency 911 call, can route information to the correct PSAP to handle the emergency 911 call. More specifically, when DTMF 911 signals of an emergency 911 call is received from a WiFi enabled wireless device that is GPS enabled, the WiFi access point may convert the DTMF 911 signals into an abbreviated dialing code for communicating to the gateway 128. In addition, a mobile directory number (MDN) and GPS coordinates are communicated from the WiFi enabled wireless device via the WiFi access point, such as WiFi access point 124a, and the controller 126 to the gateway 128. The gateway 128, in response to determining that the call is an emergency 911 call, may send the mobile directory number and WiFi access point identification information, which was previously registered with the controller 126, to the database 206. The database 206 looks up a selective router associated with a PSAP servicing the area in which the WiFi access point that received the emergency 911 call is operating and communicates the routing data to the gateway 128. The gateway 128 communicates the routing data, MDN, and GPS information to the selective router 208 looked up in the database 206. The selective router 208 may perform another look-up at a local or remote database (not shown) for determining the correct PSAP that is servicing the WiFi access point through which the emergency 911 call was initially received or is now handling the WiFi enabled wireless device. The selective router 208 may communicate the MDN and GPS information to the PSAP 202 prior to the PSAP 202 going off-hook. The MDN, GPS information, and, optionally, port ID, or any other network information may be sent in response to the emergency 911 call being placed. The address information of the WiFi access point may be sent after the PSAP 202 goes off-hook (i.e., an operator at the PSAP answers the call). In one embodiment, the address is sent using a caller ID type II data packet by the gateway 128 after the PSAP goes off-hook as further described herein. The PSAP 202 may, in turn, determine address location information of the WiFi enabled calling device with the help of local ALI 204 using the telephone number of the calling device. The MDN and GPS information are communicated to the PSAP 202 from the local ALI 204. In one embodiment, the MDN and GPS (latitude and longitudinal coordinates) information are communicated from the local ALI 204 to the PSAP 202 in a table format (see FIG. 5).

After the PSAP goes off-hook to answer the emergency 911 call, the address information of the WiFi access point may be determined by the gateway 128 and communicated to the PSAP 202. In one embodiment, the address location information is the information registered with the gateway 128 and communicated by the gateway 128 to the PSAP 202 using a type II caller ID signal format may then be utilized. Further description of the caller ID signal format is provided in FIG. 4.

As previously described, each of the WiFi access points 124 may initially register address location information that identifies a physical location of each of the respective WiFi access points 124 with the gateway 128. In registering the address location information with the gateway 128, a WiFi access point address location database 207 may be configured to store specific address location information, such as street address, building number, floor number, apartment number, suite number, gate number at an airport terminal, or any other address identifier that can provide an emergency service worker location information of a person who is using a WiFi enabled wireless device for communicating with a WiFi access point during an emergency 911 call. Although the location of the WiFi access point may not be precisely the same location as the calling party, the distance between the calling party and the WiFi access point will be within a few hundred feet, which is generally close enough for emergency personnel. Registering the WiFi access points 124 with the gateway 128 may be performed during initialization, reset, or at any other time either directly from the WiFi access point or remotely from another device. The address location information, in addition to the MDN, and GPS information, may be communicated by the gateway 128 to the PSAP 202. It should be noted that the MDN and GPS information may be communicated to the PSAP 202 while the PSAP is in the on-hook mode, whereas the address information is communicated to the PSAP 202 after the PSAP goes to the off-hook mode to answer a call. By providing the address information that identifies an address location of the WiFi access point to the PSAP 202, address location information may be displayed through a caller ID type II device that is indicative of the address of the WiFi access point with which an emergency 911 caller using a WiFi enabled wireless device is connected. The address location information, in the caller ID type II format, of the WiFi access device may be displayed through a type II caller ID device for both E911 Phase I or Phase II configured PSAPs.

Figure 3A:
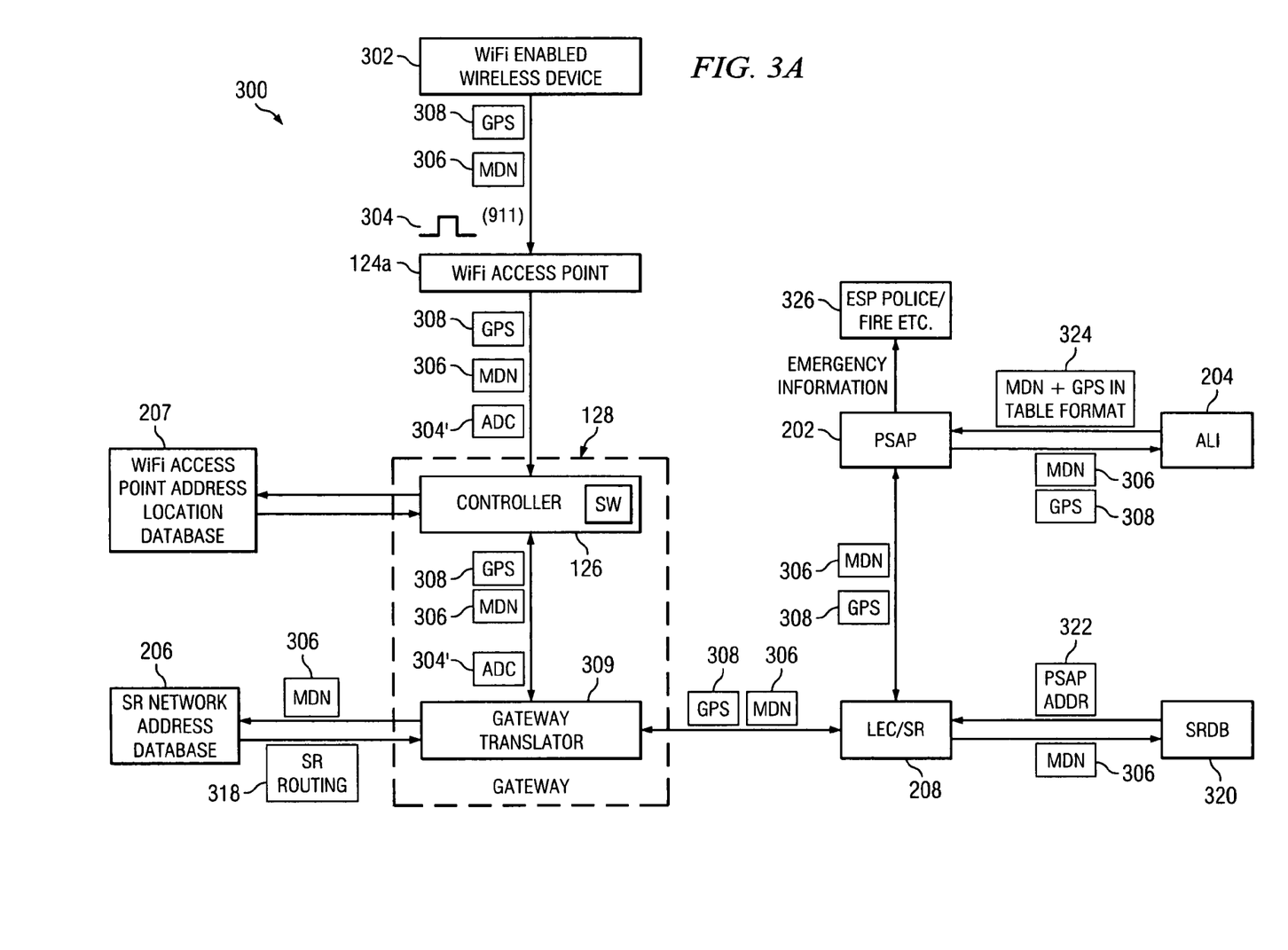
FIG. 3A is a block diagram showing exemplary information communicated from a WiFi enabled wireless device to establish a call with a public safety answering point.

FIG. 3A is a block diagram that shows a process 300 for connecting an emergency 911 call to a PSAP after the emergency 911 call is initiated. The process 300 also shows exemplary information communicated from a WiFi enabled wireless device 302 that may be configured with a GPS apparatus (not shown) to receive and generate GPS coordinates for use in locating a position of the WiFi enabled wireless device 302. Although shown as a WiFi enabled wireless device 302, the principles of the present invention may use other wireless devices capable of communicating with network access points other than cellular telephone networks.

The WiFi enabled wireless device 302, in response to a user dialing "911," may communicate dual-tone multiple frequency (DTMF) signals 304 to call an emergency service provider via PSAP, such as police or firemen. In addition to the DTMF signals 304, mobile directory number 306 and GPS information 308 may be communicated from the WiFi enabled wireless device 302 to WiFi access point 124a. The gateway 128 is shown to include controller 126, which manages the WiFi access points 124, and gateway translator 309, which translates information and signals being communicated between networks.

The WiFi access point 124a may receive the DTMF signals 304 and convert them to an abbreviated dialing code (ADC) 304'. The ADC 304' is generally formed of a multi digit number that represents a type of call or function, as understood in the art. The particular ADC that is indicative of an emergency 911 call may be pre-set by an operator of the WiFi access points 124. The ADC 304', mobile directory number 306, and GPS information 308 may be communicated to controller 126. If the WiFi enabled wireless device 302 is not GPS enabled, then GPS information 308 is not communicated. The controller 126, in response to determining that the call is an emergency 911 call, may perform actions to handle the emergency 911 call from the ADC 304', including accessing the databases 206 and 207. The mobile directory number 306 and GPS information 308 may also be communicated to the gateway 128.

The gateway 128, in response to determining that a call is an emergency 911 call, communicates the mobile directory number 306 to database 206 for looking-up selective router routing information 318 to route the mobile directory number 306 and GPS information 308 to a PSAP 202 that is servicing an area that the WiFi access point 124a is located. The gateway 128 communicates or routes the mobile directory number 306 and GPS information 308 to the appropriate local exchange carrier selective router 208. The selective router 208 communicates the mobile directory number 306 and GPS information 308 to a selective router database 320, which looks-up a PSAP network address 322 that is servicing the location of the access point 124a. The selective router 208 routes the mobile directory number 306 and GPS information 308 to the PSAP 202 at the PSAP network address 322. The PSAP 202 may communicate the MDN 306 and the GPS information 308 to the ALI 204, which may be local or remote, where a remote ALI may be operating on a mainframe computer by a third party and have more capabilities than a local ALI. In response, the ALI 204 may perform a reverse look-up to determine an address associated with the GPS coordinates. The DSAP 202 may receive the mobile directory number 306 and the GPS information 308 from the ALI 204 in a table format 324 for display on a screen (see FIG. 5).

Figure 3B:
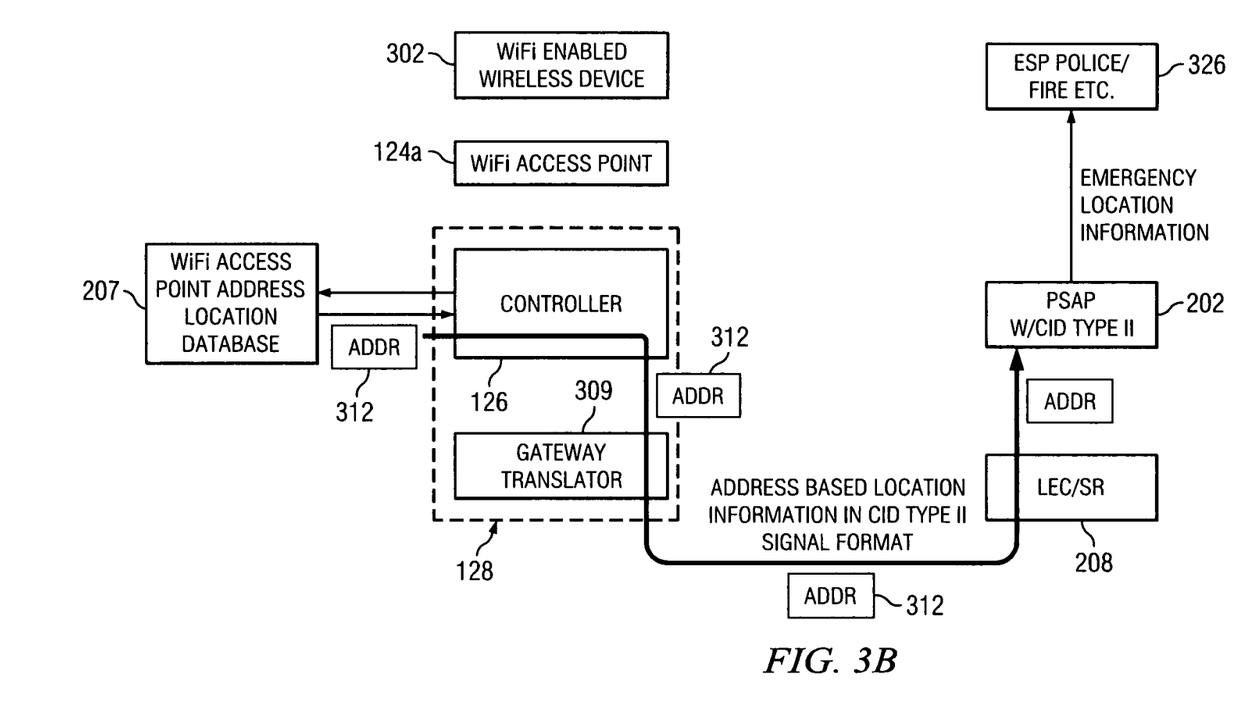
FIG. 3B is a block diagram showing exemplary address information communicated from a network gateway to a public safety answering point.
Figure 4:
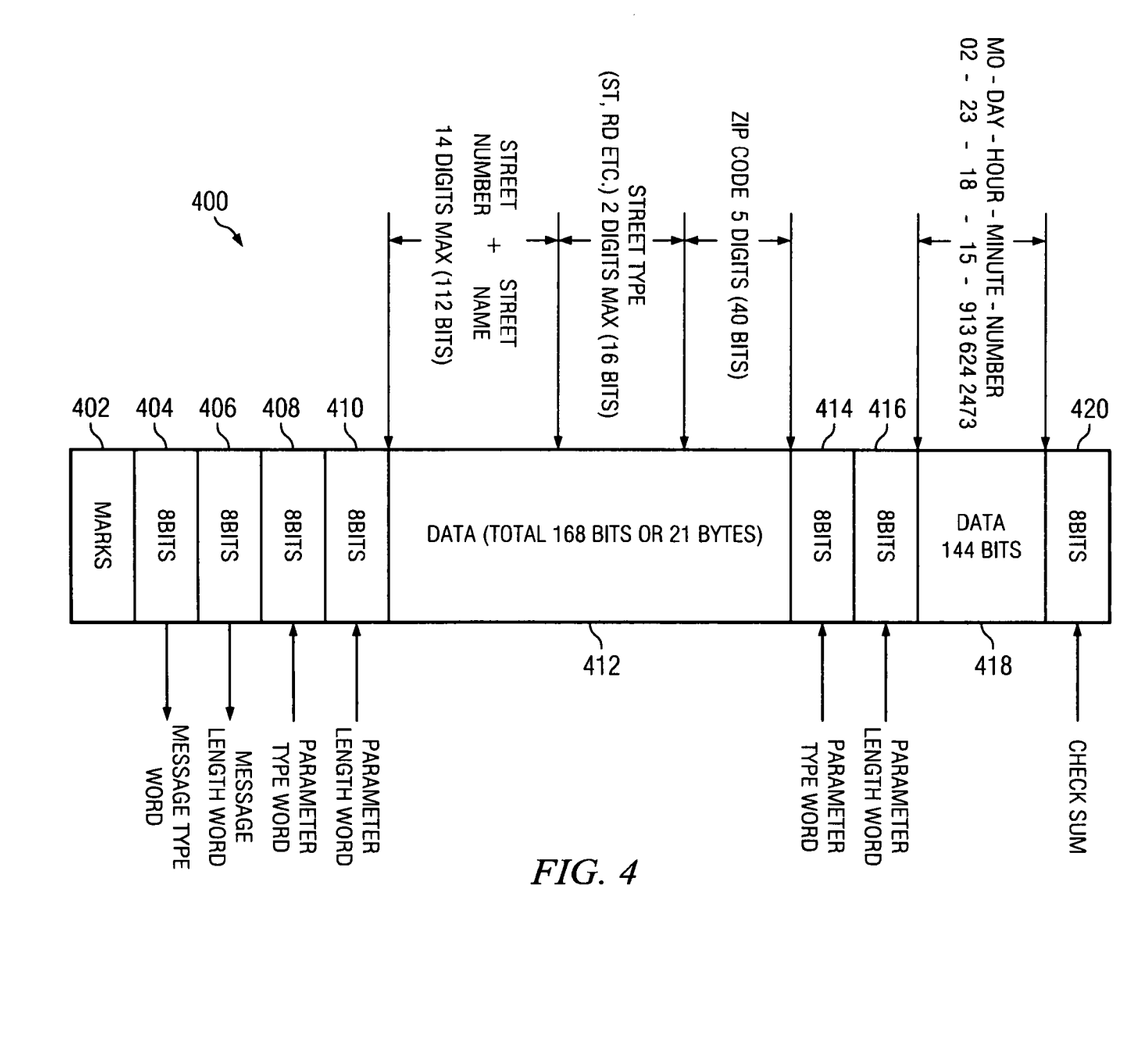
FIG. 4 is a block diagram of an exemplary signaling structure for communicating address information of a WiFi access point in a Type II caller ID data packet.

FIG. 3B is a block diagram that shows a process for sending address based location information 312 after the PSAP goes off-hook to answer the 911 call. After the 911 call is established, a release answer call message (RACM), which indicates that the PSAP 202 goes off-hook, may be sent to the gateway 128 from a network switch (not shown) to cause the gateway 128 to determine the location address of the WiFi access point 124a that is receiving the emergency call from the WiFi enabled wireless device 302. The gateway 128 determines the address location of the WiFi access point 124a by requesting the address from the WiFi access point address location database 207. The address location information 312 may be communicated from the gateway 128 to the PSAP 202 via the selective router 208. The address location information 312 may be stored and/or communicated in a type II caller ID data packet (FIG. 4). In addition, the PSAP 202 may be configured to display address location information 312. In one embodiment, the PSAP uses a type II caller ID device to display the address information of the WiFi access point 124a. By being able to display address location information 312 and address information determined by the PSAP, an operator at the PSAP 202 may have enough information to notify emergency service personnel 326 as to location of a possible victim placing an emergency 911 call. If the PSAP 202 is configured as an E911 Phase I PSAP, then address location information 312 that identifies the address location of the WiFi access point 124a is displayed, but address information associated with GPS information 308 that identifies the location of the WiFi enabled wireless device 302 cannot be displayed because the PSAP is not upgraded to phase II.

FIG. 4 is a block diagram of an exemplary signaling structure for communicating address information in a type II caller ID data packet. The signaling structure format 400 may be the same or substantially the same signaling structure as a conventional caller ID type II signaling structure as understood in the art. The signaling structure 400 includes a number of fields, including marks 402, message type 404, message length 406, parameter type 408, parameter length 410, data 412, parameter type 414, parameter length 416, data 418 and check sum 420. Although the signaling structure 400 is configured for caller ID information, such as name and telephone number to be included in data fields 412 and 418, which are 168 bits (21 characters) and 144 bits (18 characters), respectively, the principles of the present invention provide for including street number and street name (14 characters-112 bits), street type (2 characters-16 bits), and zip code (5 characters-40 bits) in the first data field 412 and date, time and phone number in the second data field 418. This FSK signaling structure 400 may be generated by a WiFi access point and the address information stored in the first data field 412 may be stored during initialization or set up of the WiFi access point locally or remotely.

More specifically, the address parameter may be ASCII equivalent of the characters that represent the address associated with the calling access line. The character subfields may be coded in 8 bit ASII (no parity) with one octet per character. No characters (e.g., spaces, commas, periods, etc.) are assumed and the relevant characters are sent. The first character of the address may be transmitted first and subsequent characters may be transmitted in order until the last character is transmitted. For example, the address "12345John Rd" may be coded over 12 octets as 00110001, 00110010, 00110011, 00110100, 00110101, 01001010, 01001111, 01001000, 01001110, 00100000 (space), 01010010, and 01000100. If the street number plus the street name combined is more than 14 characters, then the characters after 14 characters are ignored by the system. If the street number plus the street name combined occupies 11 characters then one space may be put before the street name, one space before the street type, and another space before the street code. If the street number plus the street name combined occupies 12 characters, then one space may be put before the street name and another space may be put before the zip code. If the street number plus the street name combined occupies 13 characters, then one space may be put before the street name. To minimize the total length of the displayed address message on the public-safety answering point side, no more than one space is put before the street name, street type, or zip code. If the street number plus the street name combined occupies 14 characters, then no spaces are included. Additional description of the signaling structure format 400 and communication thereof is described in co-pending patent application Ser. No. 11/430,232 filed May 8, 2006, which is incorporated herein by reference in its entirety.

In addition to the configuration of the address location information provided in FIG. 4, alternative embodiments may be utilized depending on a building type in which a WiFi access point is located. For example, for a multistory building, the database may be configured to store address location information including street number and street name (14 characters), floor number (2 digits), and zip code (5 digits). For an airport terminal, the database may be configured to store airport code and terminal name (14 characters), floor number (3 digits), and gate number (4 characters). For a shopping complex or mall, the database may be configured to store the name of the shopping complex or mall (14 characters), floor number (2 digits), and shopping mall map code (5 characters). It should be understood that the configurations for the various building types are exemplary and that other configurations and other building types may be utilized in accordance with the principles of the present invention.

In communicating the address location information, a frequency shift keying (FSK) signaling structure that includes a type II caller ID data packet may be configured to support the configuration of the address locations stored in the WiFi access point address location database 207. In other words, the data fields of the type II caller ID data packet may match the data fields that are provided in the database for each of the different building types.

Figure 5:
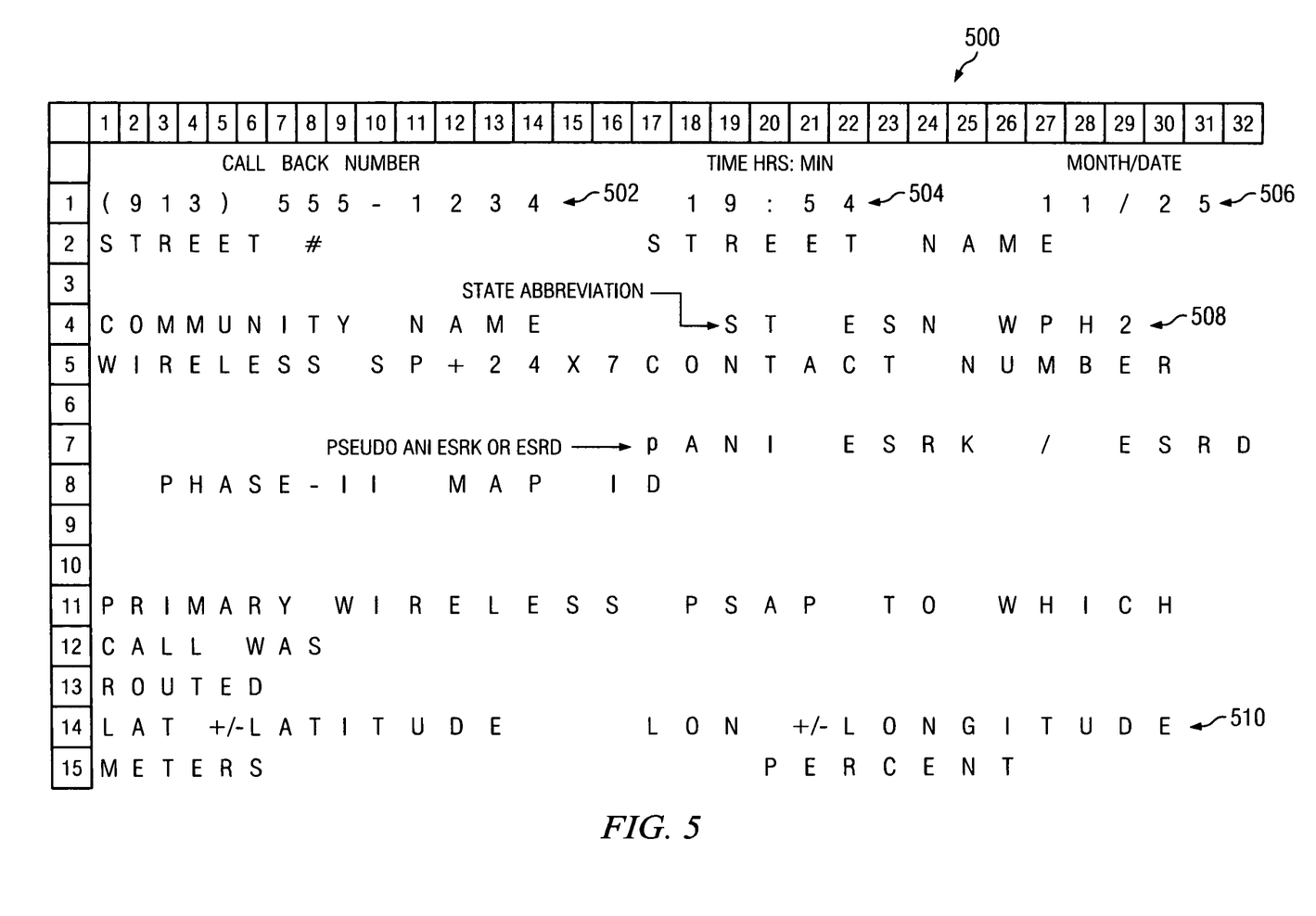
FIG. 5 is a screen shot of an exemplary screen display format at a public safety answering point.

FIG. 5 is a screen shot of an exemplary screen display format 500 at a public safety answering point. The information displayed in the PSAP screen display 500 may include information provided by the ALI database (FIG. 3). The screen may include call back number 502, time 504, date 506, and location information 508, if provided, by the ALI. In addition, GPS longitude and latitude information 510 may be displayed on the PSAP screen display format 500. Address information communicated in a type II caller ID data packet may be displayed on a separate caller ID device, such as the caller ID device 600 shown in FIG. 6.

Figure 6:
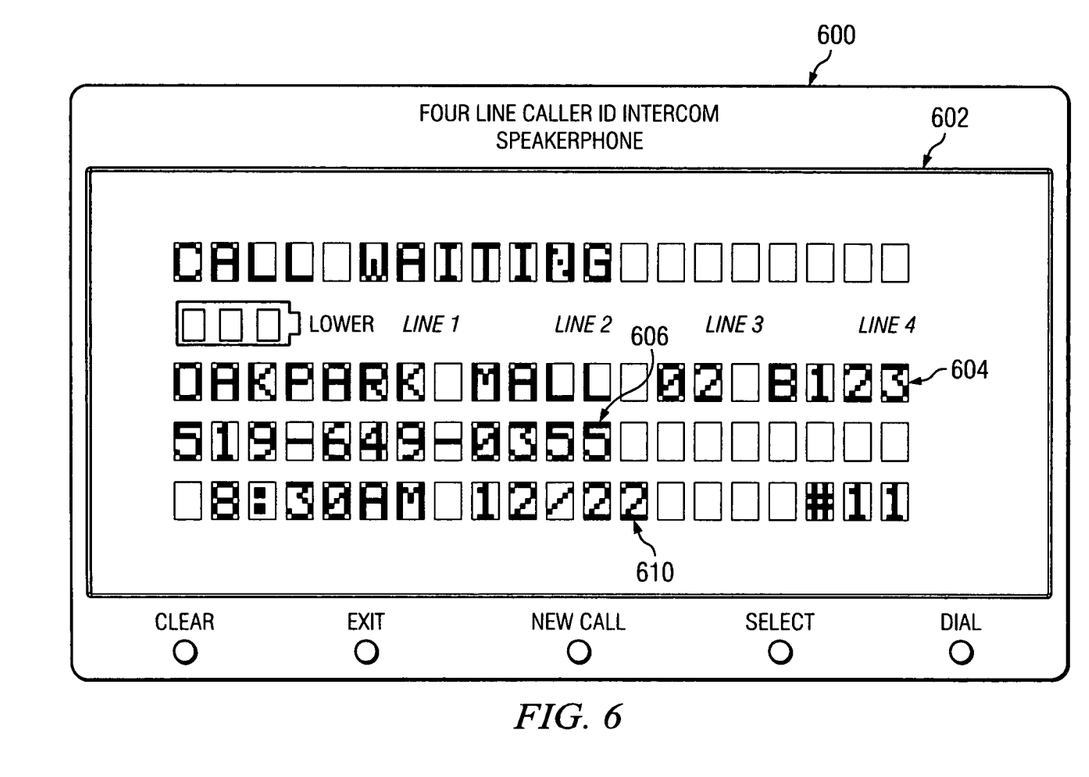
FIG. 6 is a screen shot showing exemplary address information communicated in a caller ID data packet.

FIG. 6 is a screen shot 600 showing exemplary address information communicated in a caller ID type II data packet. As shown, the caller ID device 600 includes a display 602 that is displaying an address 604, caller ID telephone number 606, time 608, and date 610. It should be understood that any information that may be communicated in a type II caller ID data packet may be displayed on the caller ID device 600 that is configured to receive information communicated in a type II caller ID data packet. The exemplary address being shown is an address of a shopping mall.

Figure 7:
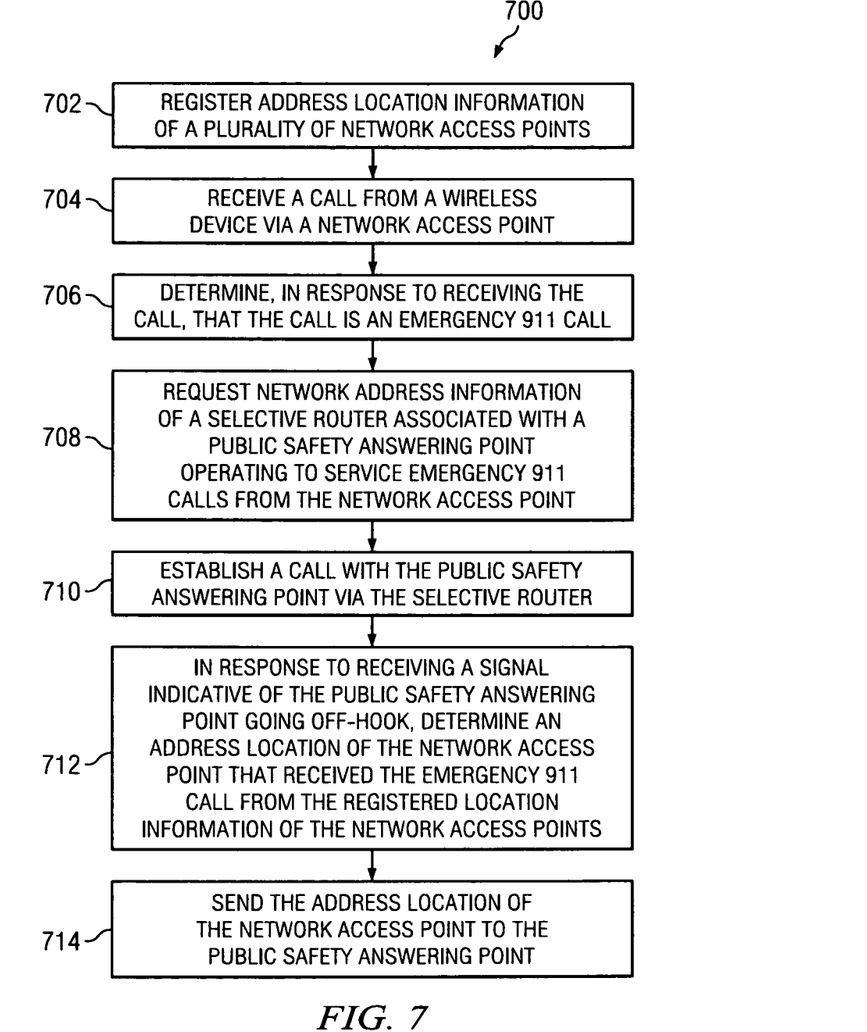
FIG. 7 is a flow diagram of an exemplary process for communicating address information of a WiFi access point from a network gateway to a public safety answering point.

FIG. 7 is a flow diagram of an exemplary process 700 for communicating address location information to a public safety answering point during an emergency 911 call. The process 700 starts at step 702, where address location information of multiple network access points are registered. In one embodiment, the network access points are WiFi network access points that form a WiFi mesh network and the registration is with a controller of a gateway. The registration may include providing address location information (i.e., a physical address) of each of the network access points. The registration may further include providing address location information specifically related to a building type in which each network access point is located. At step 704, a call from a wireless device via one of the registered network access points may be received. A determination that the call is an emergency 911 call may be made at step 706 in response to receiving the call at step 704. The determination may be made by a gateway receiving an ADC code from the network access point.

At step 708, network address information of a selective router associated with a public safety answering point operating to service emergency 911 calls from the network access point may be requested. The request may be from the gateway to a database that includes selective router network addresses. At step 710, a call with the public safety answering point may be established. At step 712, in response to receiving a signal indicative of the public safety answering point going off-hook an address location of the network access point that received the emergency 911 call from the registered location information of the network access points may be determined. The address location of the network access point may be sent to the public safety answering point at step 714. In one embodiment, the address location is sent via a type II caller ID data packet.

The previous detailed description is of a small number of embodiments for implementing the invention and is not intended to be limiting in scope. For example, although one embodiment has been described as a WiFi access point, any other communication protocol may utilize the principles of the present invention. One of skill in this art will immediately envisage the methods and variations used to implement this invention in other areas than those described in detail. The following claims set forth a number of the embodiments of the invention disclosed with greater particularity.

What is claimed:

1. A system for providing address location information to a public safety answering point during a wireless 911 call, said system comprising:
    a plurality of WiFi network access points configured to wirelessly receive calls from wireless devices;
    a gateway in communication with said WiFi network access points, said gateway including:
        a controller configured to receive communications from said WiFi network access points; and
        an interpreter configured to interpret first signals having a protocol for communication over a first network into second signals having a protocol for communication over a second network, the second signals being communicated over the second network on which public safety answering points operating to service emergency 911 calls are operating;
    a first database in communication with said gateway and configured to store network address information of selective routers associated with the public safety answering points; and
    a second database in communication with said gateway and configured, prior to the receipt of a wireless 911 call, to receive a registration of each of said network access points and upon registration, store physical address location information of said WiFi network access points, said gateway configured to receive the wireless 911 call and, in response to receiving the emergency 911 call, (i) determine network address information of a selective router associated with a public safety answering point operating to service emergency 911 calls for an area in which said WiFi network access points are operating from the first database, (ii) determine a physical address location of the WiFi network access point that received the emergency 911 call from the second database, and (iii) send the physical address location of the WiFi network access point to the public safety answering point, in response to the public safety answering point going off-hook to answer the emergency 911 call.

2. The system according to claim 1, wherein the address location information includes particular locations within buildings in which each respective WiFi network access point is operating.

3. The system according to claim 1, wherein said gateway is further configured to receive an abbreviated dialing code from the WiFi network access point that received the emergency 911 call and, in response to receiving the abbreviated dialing code, determine the address location of the WiFi network access point by sending a request for the WiFi network access point to said second database.

4. The system according to claim 1, wherein said gateway is further configured (i) to receive a signal indicative of the public safety answering point going off-hook in response to receiving a call signal from the gateway and (ii) to send the address location of the WiFi network access point in a type II caller ID data packet to the public safety answering point.

5. The system according to claim 1, wherein said gateway is further configured to receive GPS coordinates from the wireless device that placed the emergency 911 call and communicate the GPS coordinates to the public safety answering point.

6. The system according to claim 1, wherein said WiFi network access points are configured to receive 911 DTMF signals and, in response, generate an abbreviated dialing code signal to notify said gateway that an emergency 911 call is being placed.

7. The system according to claim 1, wherein said second database is configured to store address location information particular about the address location of each WiFi network access point depending on the type of building the respective WiFi network access point is located, and said gateway is further configured to format a type II caller ID data packet with the address location information of the WiFi network access point that received the emergency 911 call based on the type of building the respective WiFi network access point is located.

8. The system according to claim 7, wherein the address location information is a particular gate within an airport terminal building and wherein the gate is included in a field within the type II caller ID data packet.

9. A method for providing address location information to a public safety answering point during a wireless 911 call, said method comprising:
    prior to receiving a wireless 911 call, registering a physical address location information of a plurality of WiFi network access points with a WiFi network access point physical address location database;
    wirelessly receiving a wireless 911 call from a wireless device via one WiFi network access point of the registered WiFi network access points;
    determining, in response to receiving the wireless 911 call, that the call is an emergency 911 call;
    requesting address information of a selective router associated with a public safety answering point operating to service emergency 911 calls from the WiFi network access point, wherein said selective router address information is stored on a selective router address database which is separate from the WiFi network access point physical address location database;
    establishing a call with the public safety answering point via the selective router;
    in response to receiving a signal indicative of the public safety answering point going off-hook, determining the physical address location of the WiFi network access point that received the emergency 911 call from the WiFi network access point physical address location database; and
    sending the physical address location of the WiFi network access point to the public safety answering point, in response to the public safety answering point going off-hook to answer the emergency 911 call.

10. The method according to claim 9, wherein registering the address location information includes storing particular locations within buildings in which each respective WiFi network access point is operating.

11. The method according to claim 9, further comprising receiving an abbreviated dialing code from the WiFi network access point that received the emergency 911 call and, in response to receiving the abbreviated dialing code, determining the registered address location of the WiFi network access point.

12. The method according to claim 9, further comprising (i) receiving a signal indicative of the public safety answering point going off-hook in response to receiving a call signal from the gateway and (ii) sending the address location of the WiFi network access point in a type II caller ID data packets to the public safety answering point.

13. The method according to claim 9, further comprising receiving GPS coordinates from the wireless device that placed the emergency 911 call and communicating the GPS coordinates to the public safety answering point.

14. The method according to claim 9, further comprising storing address location information particular about the address location of each WiFi network access point depending on the type of building the respective WiFi network access point is located, and formatting a type II caller ID data packet with the address location information of the WiFi network access point that received the emergency 911 call based on the type of building the respective WiFi network access point is located.

15. The method according to claim 14, wherein formatting the type II caller ID data packet includes including an indicia of a particular gate within an airport terminal building within a field within the type II caller ID data packet.

16. The method according to claim 9, wherein formatting the type II caller ID data packet includes including an indicia of a name of shopping location, floor number, and map code.

* * * * *